(12) United States Patent
Wolfond et al.

(10) Patent No.: US 8,484,709 B2
(45) Date of Patent: *Jul. 9, 2013

(54) MULTI-MODE CREDENTIAL AUTHENTICATION

(75) Inventors: Gregory Howard Wolfond, Toronto (CA); Jaime Shapiro, Toronto (CA); Robert Paul Mansz, Rothesay (CA)

(73) Assignee: Authenticor Identity Protection Services Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,724

(22) Filed: May 9, 2011

(65) Prior Publication Data

US 2011/0214171 A1    Sep. 1, 2011

Related U.S. Application Data

(63) Continuation of application No. 11/331,862, filed on Jan. 13, 2006, now Pat. No. 7,941,835.

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC ....... 726/7; 726/18; 726/19; 726/21; 713/186

(58) Field of Classification Search
None
See application file for complete search history.

(56) References Cited

U.S. PATENT DOCUMENTS

| 4,972,476 | A | * | 11/1990 | Nathans | 713/186 |
| 4,995,081 | A | * | 2/1991 | Leighton et al. | 713/186 |
| 5,127,043 | A | | 6/1992 | Hunt et al. | |
| 6,594,376 | B2 | | 7/2003 | Hoffman | |
| 6,758,394 | B2 | | 7/2004 | Maskatiya et al. | |
| 6,920,435 | B2 | | 7/2005 | Hoffman | |
| 6,934,849 | B2 | | 8/2005 | Kramer | |
| 6,957,337 | B1 | | 10/2005 | Chainer | |

(Continued)

FOREIGN PATENT DOCUMENTS

| WO | 2006/065002 A1 | 6/2006 |
| WO | 2009/001197 A2 | 12/2008 |
| WO | 2010/063091 A2 | 6/2010 |

OTHER PUBLICATIONS

Ross et al., "Multimodal Biometrics: An Overview" Sep. 2004, Proc of 12th European Signal Processing Conference, pp. 1221-1224.

(Continued)

*Primary Examiner* — Shin-Hon Chen
(74) *Attorney, Agent, or Firm* — Greenberg Traurig, LLP

(57) ABSTRACT

A method for authenticating an identity involves a computing device receiving a first credential over a first communications channel, and determining a second communications channel from a comparison between the first received credential and a first reference credential provisionally associated with the first credential. The computing device opens the second communications channel and receives second credential over the second communications channel, and the identity is authenticated based on a verification of the second credential. The computing device authenticates the identity by generating a first identity proof score from a correlation between the first received credential and the first reference credential, generating a second identity proof score from a correlation between the second received credential and a second reference credential, and generating an ultimate identity proof score from the first identity proof score and the second identity proof score.

14 Claims, 5 Drawing Sheets

U.S. PATENT DOCUMENTS

| | | | |
|---|---|---|---|
| 7,131,009 B2 * | 10/2006 | Scheidt et al. | 713/182 |
| 7,343,623 B2 * | 3/2008 | Ross | 726/6 |
| 7,373,515 B2 * | 5/2008 | Owen et al. | 713/182 |
| 7,861,077 B1 | 12/2010 | Gallagher, III | |
| 2002/0133708 A1 | 9/2002 | Gudorf | |
| 2003/0163739 A1 | 8/2003 | Armington et al. | |
| 2003/0221125 A1 | 11/2003 | Rolfe | |
| 2004/0010698 A1 * | 1/2004 | Rolfe | 713/186 |
| 2004/0030935 A1 * | 2/2004 | Kai | 713/202 |
| 2005/0010758 A1 | 1/2005 | Landrock et al. | |
| 2005/0268107 A1 | 12/2005 | Harris et al. | |
| 2007/0150747 A1 * | 6/2007 | Mani et al. | 713/186 |
| 2008/0212771 A1 | 9/2008 | Hauser | |

OTHER PUBLICATIONS

Armington, John et al., "Biometric Authentication in Infrastructure Security", 2002.

Ho, Purdy et al. "A Dual-Factor Authentication System Featuring Speaker Verification and Token Technology", 2003.

Looi, M. "Enhanced Authentication Services for Internet Systems Using Mobile Nnetworks", 2001.

Wu, Min et al. "Secure Web Authentication with Mobile Phones", 2004.

* cited by examiner

MULTI-MODE CREDENTIAL AUTHENTICATION

RELATED APPLICATIONS

This patent application is a continuation of U.S. patent application Ser. No. 11/331,862 (filed Jan. 13, 2006, entitled "MULTI-MODE CREDENTIAL AUTHENTICATION", and presently pending).

FIELD OF THE INVENTION

The invention described herein relates to a mechanism for credential-based authentication. In particular, the invention relates to a method and system for authenticating an identity using biometric credentials.

BACKGROUND OF THE INVENTION

The state of the art is replete with mechanisms for authenticating the identity of an individual using biometric credentials.

For instance, Chainer (U.S. Pat. No. 6,957,337) teaches a method for authenticating a user using one or more biometrics. The method begins with a received biometric being compared against a stored biometric. If the received biometric does not match a stored biometric, the user is prompted to provide another biometric which, in turn, is compared against a stored biometric. The method repeats until a received biometric matches a stored biometric, whereupon the user is authenticated.

Maskativa (U.S. Pat. No. 6,758,394) teaches a method for authorizing a customer to perform transactions with a self-service device. The method involves extracting a first biometric set of text data from a verification instrument, and extracting a second biometric set directly from the customer. The biometric sets are then compared to determine whether they are derived from the same individual.

Hoffman (U.S. Pat. No. 6,594,376) teaches a method for tokenless authorization of a commercial transaction, that begins with the buyer accepting a seller's offer by providing the buyer's personal identification number (PIN) and at least one biometric sample to a computer server. The computer system uses the PIN to locate a previously-provided biometric, and then compares the received biometric with the previously-provided biometric. The computer system then authorizes the transaction based on the result of the comparison.

Hoffman (U.S. Pat. No. 6,920,435) teaches a method for tokenless authorization of an electronic transaction, that begins with the computer system comparing a received biometric with a previously-provided biometric. If the received biometric matches the previously-provided biometric, a transaction processor is selected for completion of the transaction. A stored audio signature associated with the transaction processor is then sent to the user to thereby identify the transaction processor that conducted the electronic transaction.

Kramer (U.S. Pat. No. 6,934,849) teaches a method for authorizing a commercial transaction that begins with the service provider establishing a telephone link with an authorization provider. If the telephone link has been previously authorized, the service provider accepts the link, and then requests the customer to provide an identifier and a biometric sample over the link. The authorization provider authorizes the transaction if the correspondence between the biometric sample and a stored biometric exceeds a threshold value.

Gudorf (US 2002/0133708) teaches a method for authenticating an e-commerce transaction that involves receiving from a user a transaction request, and personal information associated with the user. The personal information includes a biometric, and an address to which a permission request can be sent. The permission request includes a request for permission to provide additional information to the user. Upon verification of the personal information, the permission request is issued to the user at the specified address. The additional information is delivered to the user if the user grants permission in response to the permission request.

In each of these proposed solutions, the authentication of the user is determined by a comparison of a biometric sample with a previously-supplied biometric. As a result, the solutions are prone to fraud to the extent that the credentials can be duplicated by unscrupulous parties.

Further, the solutions rely heavily on the ability of the computer system to match a biometric sample with a saved biometric. As a result, the outcome of the match is limited by the consistency by which the user can duplicate the saved biometric.

SUMMARY OF THE INVENTION

The invention authenticates the identity of a person, based on received credentials. A first credential acts as a provisional indication of the person's identity, and is used to select a communications channel over which to receive a second credential. The provisional identity is authenticated by verifying the second received credential. In the context of this invention, a credential is something that is uniquely associated with the person, and includes both non biometric credentials (e.g. name, address) and biometric credentials (e.g. facial features, voiceprint, fingerprint).

The invention may be used to facilitate a transaction where proof of identity of an individual is required. The transaction may include, for example, a financial lending transaction, and/or an identity authentication transaction. The identity authentication transaction typically effects issuance of an instrument of identification or entitlement to a good or service, such as a passport, a driver's license, or a Health card. Further, at least one of the credentials may include a biometric credential.

According to one aspect of the invention, there is provided a method for authenticating an identity, that involves a computing device receiving a first credential over a first communications channel, and determining a second communications channel from a comparison between the first received credential and a first reference credential. The second communications channel is provisionally associated with the first credential and is different from the first communications channel. The computing device opens the second communications channel and receives a second credential over the opened second communications channel. The computing device authenticates the identity by generating a first identity proof score from a correlation between the first received credential and the first reference credential, generating a second identity proof score from a correlation between the second received credential and a second reference credential, and generating an ultimate identity proof score from the first identity proof score and the second identity proof score.

The first identity proof score is indicative of a first correlation level between the first received credential and the first reference credential, the second identity proof score is indicative of a second correlation level between the second received credential and the second reference credential, and the ultimate identity proof score is indicative of a confidence level in a correlation between the received credentials and the identity.

In one implementation, the first received credential comprises a first received biometric credential and a first received non-biometric credential, the first reference credential comprises a first reference biometric credential and a first reference non-biometric credential, and the first identity proof score generating comprises generating the first identity proof score from a comparison between the first received biometric credential and the first reference biometric credential and a comparison between the first received non-biometric credential and the first reference non-biometric credential.

The second communications channel may be uniquely associated with the first reference non-biometric credential, and the communication channel determining may comprise the computing device determining the second communications channel from a comparison between the first received non-biometric credential and the first reference non-biometric credential. The second received credential may comprise a second received biometric credential, the second reference credential may comprise a second reference biometric credential, and the second identity proof score generating may comprise generating the second identity proof score from a comparison between the second received biometric credential and the second reference biometric credential.

In another implementation, the second communications channel opening comprising the computing device initiating communication at a predetermined time to a communications address that is uniquely associated with the first reference credential. The predetermined time may be associated with the first reference credential. The predetermined time may comprise a predetermined elapsed time after receipt of the first received credential. The second communications channel may comprise a telephone network channel, the communications address may comprise a telephone number, and the communication initiating may comprise the computing device initiating a telephone call to the telephone number at the predetermined elapsed time.

According to another aspect of the invention, there is provided an identity proofing system that includes a credential management facility retaining reference credentials, a first credential sample acquisition procedure, a second credential sample acquisition procedure, and an identity proofing procedure that is in communication with the sample acquisition procedures and the credential management facility. The first credential sample acquisition is configured to receive a first credential over a first communications channel and to determine a second communications channel from a comparison between the first received credential and a first reference credential. The first credential is provisionally associated with an identity. The second communications channel is provisionally associated with the first credential and is different from the first communications channel. The second credential sample acquisition procedure is configured to receive a second credential over the second communications channel by opening the second communications channel and receiving the second credential over the opened second communications channel.

The identity proofing procedure provided is configured to authenticate the identity by generating a first identity proof score from a correlation between the first received credential and the first reference credential, generating a second identity proof score from a correlation between the second received credential and a second reference credential, and generating an ultimate identity proof score from the first identity proof score and the second identity proof score. The first identity proof score is indicative of a first correlation level between the first received credential and the first reference credential, the second identity proof score is indicative of a second correlation level between the second received credential and the second reference credential, and the ultimate identity proof score is indicative of a confidence level in a correlation between the received credentials and the identity.

In one implementation, the first received credential comprises a first received biometric credential and a first received non-biometric credential, the first reference credential comprises a first reference biometric credential and a first reference non-biometric credential, and the identity proofing procedure is configured to generate the first identity proof score from a comparison between the first received biometric credential and the first reference biometric credential and a comparison between the first received non-biometric credential and the first reference non-biometric credential.

The second communications channel may be is uniquely associated with the first reference non-biometric credential, and the second credential sample acquisition procedure may be configured to determine the second communications channel from a comparison between the first received non-biometric credential and the first reference non-biometric credential. The second received credential may comprise a second received biometric credential, the second reference credential may comprise a second reference biometric credential, and the identity proofing procedure may be configured to generate the second identity proof score from a comparison between the second received biometric credential and the second reference biometric credential.

In another implementation, the second credential sample acquisition procedure is configured to open the second communications channel by initiating communication at a predetermined time to a communications address uniquely associated with the first reference credential. The predetermined time may be associated with the first reference credential. The predetermined time may comprise a predetermined elapsed time after receipt of the first received credential. The second communications channel may comprise a telephone network channel, the communications address may comprise a telephone number, and the second credential sample acquisition procedure may be configured to initiate the communication by initiating a telephone call to the telephone number at the predetermined elapsed time.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Financial Transaction Authorization System 100

Figure 1:
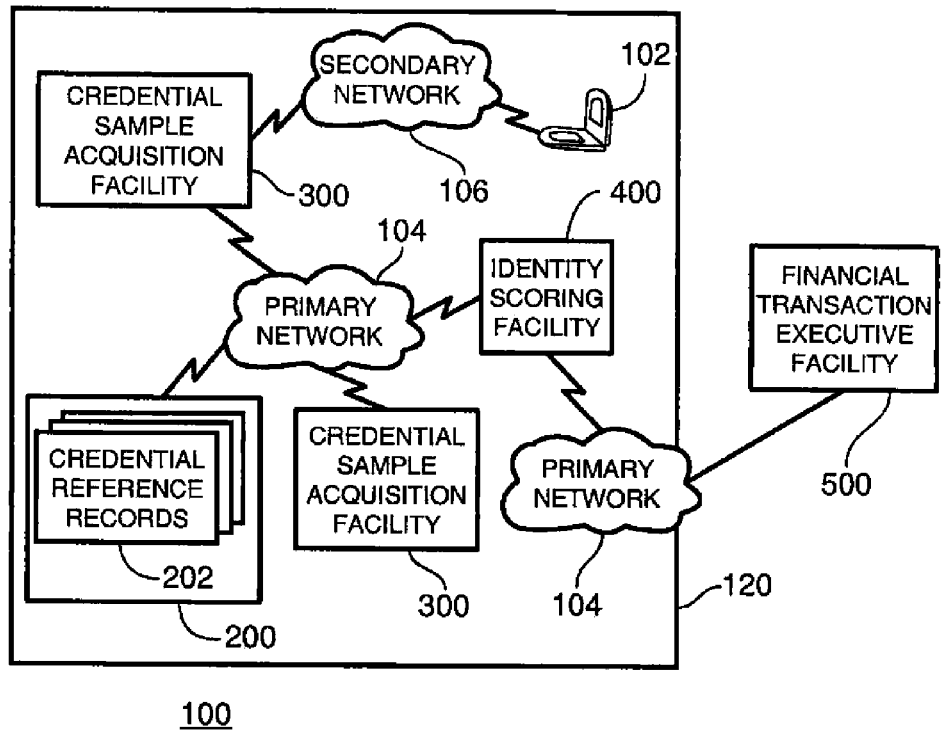
FIG. 1 is a schematic view of an identity proofing system, according to the invention, in communication with a financial transaction executive facility.

Turning to FIG. 1, a financial transaction authorization system, denoted generally as 100, is shown comprising an identity proofing system 120, and a financial transaction executive facility 500 in communication with the identity proofing system 120.

As will be described, when used in the context of the financial transaction authorization system 100, the identity proofing system 120 provides an identity confidence level which the financial transaction executive facility 500 uses (typically amongst other parameters) to authorize a financial lending transaction. However, the invention is not limited to this context, but instead may be used in other environments where a confidence level of the identity of a user is desired. By way of example, the identity proofing system 120 may be configured to provide an identity confidence level for use in the context of approving a passport application, a driver's license application, or providing access to a secure database, a web site, or a communications device.

The identity proofing system 120 comprises a credential management facility 200, a plurality of credential sample acquisition facilities 300, an identity scoring facility 400, a personal communications device 102, a primary network 104, and a secondary network 106. Although the financial transaction authorization system 100 is shown including two credential sample acquisition facilities 300, the financial transaction authorization system 100 may instead include more than two credential sample acquisition facilities 300, or only one credential sample acquisition facility 300.

Preferably, the credential management facility 200, the credential sample acquisition facilities 300, and the identity scoring facility 400 are deployed on distinct computer servers. However, one or more of these facilities may be integrated onto a common computer server.

The personal communications device 102 typically comprises a wireless or wired telephone handset. However, other forms of communications devices are contemplated, including a personal computer, and a personal data assistant (PDA), provided that the communications device allows the user thereof to provide a biometric sample.

The primary network 104 interconnects, and facilitates communication between, the financial transaction executive facility 500 and the identity scoring facility 400 of the identity proofing system 120. The primary network 104 also interconnects, and facilitates communication between, the credential management facility 200, the credential sample acquisition facilities 300, and the identity scoring facility 400. Preferably, the primary network 104 comprises an Internet Protocol (IP)-based network. However, the primary network 104 is not limited to any particular form of network, as long as the primary network 104 facilities communication between the facilities 200, 300, 400, 500.

The secondary network 106 interconnects, and facilitates communication between, the identity scoring facility 400, one of the credential sample acquisition facilities 300, and the personal communications device 102. Preferably, the secondary network 106 comprises a telephony network. However, are network forms are contemplated, including IP-based network, provided that the secondary network 106 facilities communication between the identity scoring facility 400, the credential sample acquisition facility 300 and the personal communications device 102.

Credential Management Facility 200

The credential management facility 200 is a computer server repository having a database of reference credential records 202 for all the users registered with the financial transaction authorization system 100. As will be explained, the identity scoring facility 400 uses the reference credential records 202 to verify the identity of a user of the financial transaction authorization system 100.

Each credential record 202 is uniquely associated with a specific registered user, and includes both non-biometric credential data and biometric credential data. Preferably, the non-biometric credential data of each credential record 202 includes the user's name, mailing address, and one or more network addresses at which the user can be contacted via the personal communications device 102. Alternately, the non-biometric credential data may specify that the user will initiate communication with one of the credential sample acquisition facilities 300 using the personal communications device 102 at the specified network address. The network addresses are uniquely associated with the registered user, and will typically include a telephone number, a pager number, an e-mail address, a dedicated IP address, and/or a SMS address assigned to the registered user.

In addition, the non-biometric credential data may also include the day/time (specified either as an absolute time or a relative time) at which the user can be contacted at each network address (or from which the user will contact the credential sample acquisition facility 300); the number of contact attempts for each network address; and/or a secret question and answer (known to the user).

Preferably, the biometric credential data of each credential record 202 includes a digitized human-verifiable biometric, and one or more digitized electronically-verifiable biometrics. However, the invention is not limited to this number of biometrics. Accordingly, each credential record 202 can include more or less than the foregoing number of biometrics, provided that the credential record 202 includes at least one electronically-verifiable biometric. Typically, the human-verifiable biometric is a digitized picture of the registered user, and the electronically-verifiable biometrics include a digitized fingerprint and a digitized voice-sample of the registered user.

Ideally, the biometric credential data of each credential record 202 includes an index that is uniquely associated with the electronically-verifiable biometrics. Preferably, the index is generated using a suitable hash algorithm which has, as its inputs, several artifacts (points of interest) of the respective electronically-verifiable biometrics.

Credential Sample Acquisition Facilities 300

Figure 2:
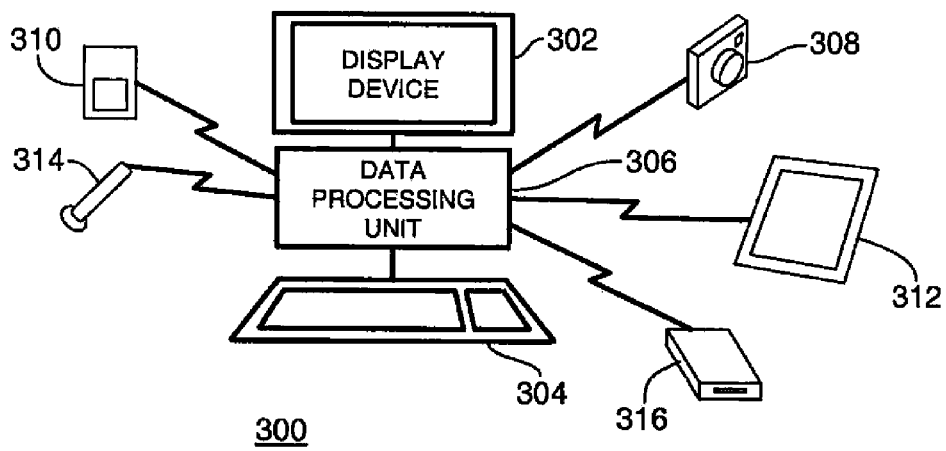
FIG. 2 is a schematic view of one of the credential sample acquisition facilities of the identity proofing system depicted in FIG. 1.

The credential sample acquisition facilities 300 are configured to acquire and/or provide credential samples of a user of the financial transaction authorization system 100. As shown in FIG. 2, preferably each credential sample acquisition facility 300 is provided as an electronic data terminal, and comprises a display device 302, and a data processing unit 306 connected to the display device 302.

The data processing unit 306 includes a primary network interface (not shown) that interfaces the credential sample acquisition facility 300 to the primary network 104, and a secondary network interface (not shown) that interfaces the credential sample acquisition facility 300 to the secondary network 106.

In addition, preferably the credential sample acquisition facility 300 includes one or more non-biometric sample acquisition devices and one or more biometric sample acquisition devices connected to the data processing unit 306. In FIG. 2, the non-biometric sample acquisition devices include a keyboard 304, and a Smartcard reader 316; and the biometric sample acquisition devices include a digital camera 308, a fingerprint scanner 310, an optical image scanner 312, and a microphone 314 (or other similar voice-sample recording device).

As will become apparent, the credential sample acquisition facility 300 acquires credential samples from the non-biometric and biometric sample acquisition devices over a communications channel that is local to the data processing unit 306. The credential sample acquisition facility 300 acquires credential samples from the personal communications device 102 over a communications channel that is remote from the data processing unit 306.

Identity Scoring Facility 400

The identity scoring facility 400 interfaces with the credential management facility 200 and the credential sample acquisition facilities 300 over the primary network 104, and is configured to provide the financial transaction executive facility 500 with an indication (ultimate identity proof score) of the level of confidence in the alleged identity of a user of the financial transaction authorization system 100. However, as discussed above, the identity scoring facility 400 is not limited for use in authorizing a financial transaction, but may be deployed in other environments where a confidence level of the identity of a user is desired.

Figure 3:
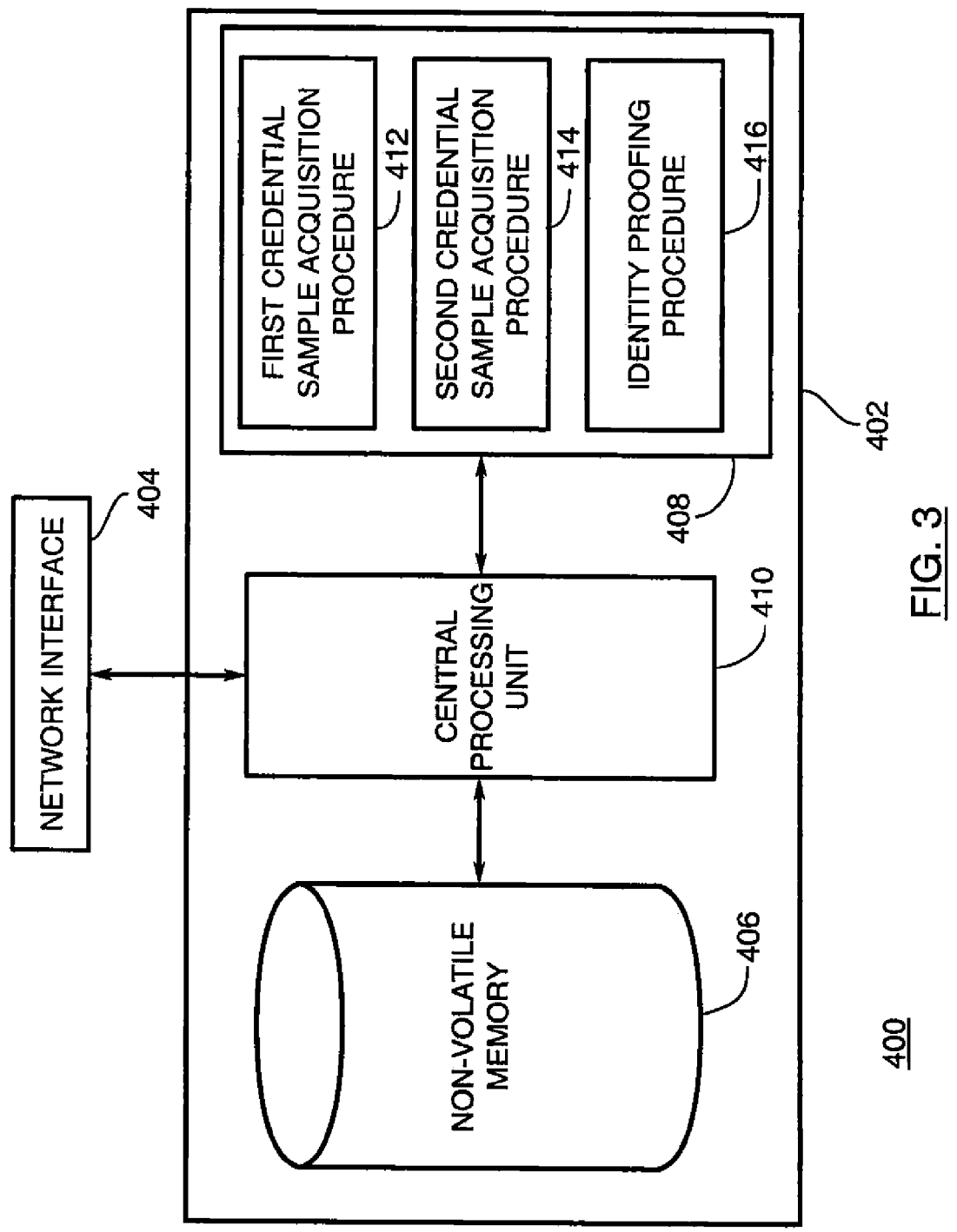
FIG. 3 is a schematic view of the identity scoring facility of the identity proofing system depicted in FIG. 1.

As shown in FIG. 3, the identity scoring facility 400 is provided as a computer server, and comprises a data processing unit 402, and a network interface 404 that interfaces the data processing unit 402 to the primary network 104. The data processing unit 402 includes a non-volatile memory (ROM) 406, a volatile memory (RAM) 408, and a central processor (CPU) 410 coupled to the ROM 406 and the RAM 408. The ROM 406 includes computer processing instructions which, when loaded into the RAM 408 and executed by the CPU 410, define in the RAM 408 a first credential sample acquisition procedure 412, a second credential sample acquisition procedure 414, and an identity proofing procedure 416.

The first credential sample acquisition procedure 412 configures the identity scoring facility 400 to receive from a user of the financial transaction authorization system 100 a first credential over a first communications channel, and to determine a second communications channel that is different from the first communications channel and is provisionally associated with the first credential. The first credential is provisionally associated with an identity. Preferably, the first credential includes a first biometric.

The second credential sample acquisition procedure 414 configures the identity scoring facility 400 to receive a second credential over the second communications channel. The second received credential includes a second biometric.

The identity proofing procedure 416 is in communication with the sample acquisition procedures and the credential management facility, and configures the identity scoring facility 400 to authenticate the provisional identity of the user in accordance with a verification of the second credential.

To do so, the identity proofing procedure 416 generates a first identity proof score from the first received credential and a first reference credential stored in the credential management facility 200, generates a second identity proof score from the second received credential and a second referenced credential stored in the credential management facility 200, and generates an ultimate identity proof score from the first identity proof score and the second identity proof score.

The first identity proof score is indicative of a first correlation level between the first credential and the first reference credential. The second identity proof score is indicative of a second correlation level between the second biometric credential and the second reference biometric. The ultimate identity proof score is indicative of a confidence level in a correlation between the received credentials and the provisional identity of the user. Depending on the configuration, the identity proofing procedure 416 may generate the second identity proof score either subsequently or concurrently with the first identity proof score.

Figure 7:
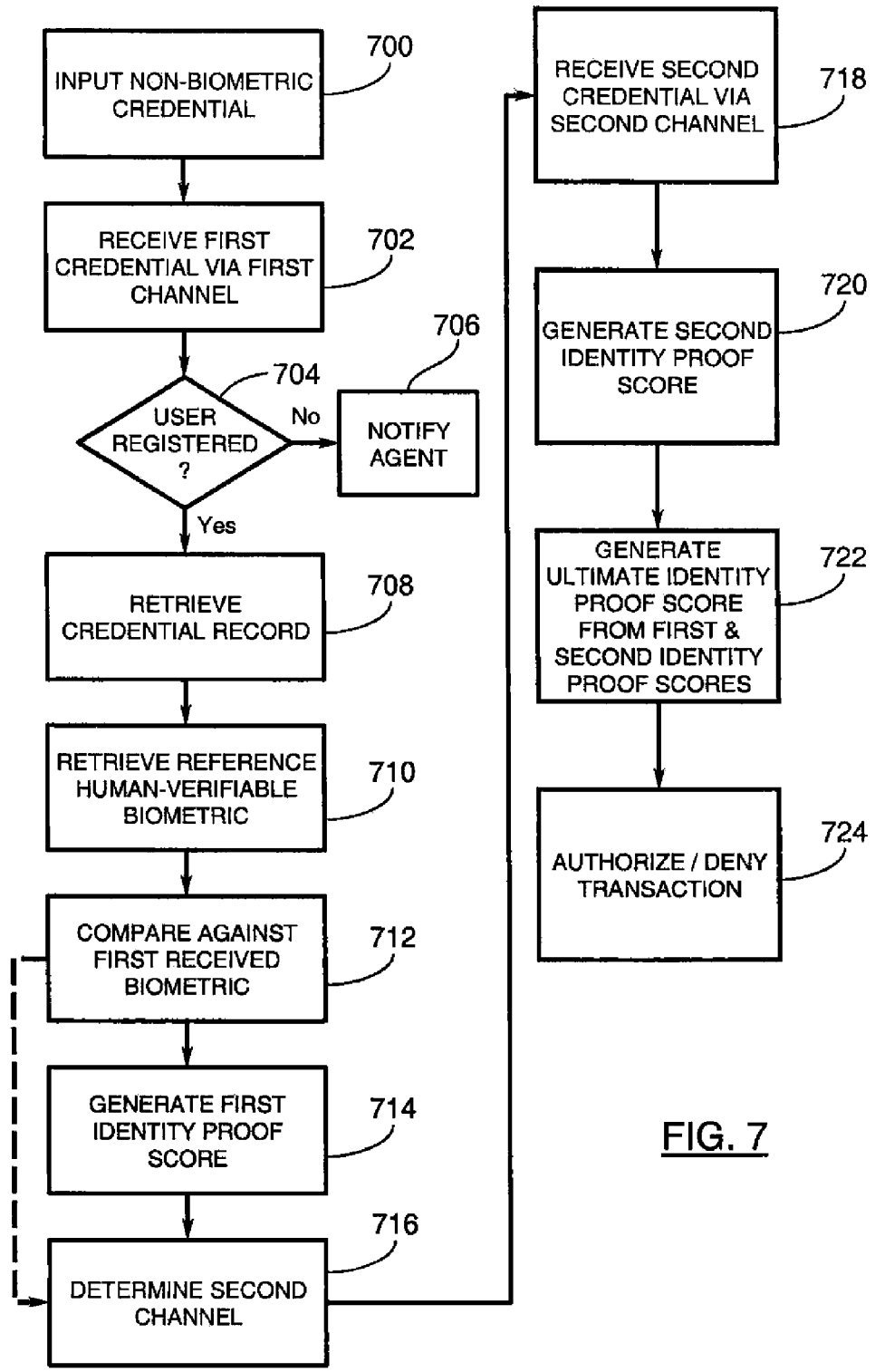
FIG. 7 is a flowchart depicting, in detail, the method of identity proof score generation depicted in FIG. 5.

The operation of the first credential sample acquisition procedure 412, the first credential sample acquisition procedure 414, and the identity proofing procedure 416 will be discussed in greater detail with reference to FIG. 7.

Financial Transaction Executive Facility 500

The financial transaction executive facility 500 interfaces with the identity proofing system 120, and receives the ultimate identity proof score from the identity scoring facility 400 via the primary network 104. Preferably, the financial transaction executive facility 500 is provided as a computer server that is operated by a financial institution, and is used by the financial institution to assist with the authorization of a financial lending transaction requested by the user. To assist with the authorization step, the financial institution will use the ultimate identity proof score received from the identity scoring facility 400. However, as will be apparent, typically the financial institution will base the transaction authorization step on a number of factors in addition to the ultimate identity proof score, including (but not limited to) credit rating, type of transaction (e.g. secured, unsecured), and monetary sum involved in the transaction.

Method of Authorizing Financial Lending Transaction—Overview

Figure 4:
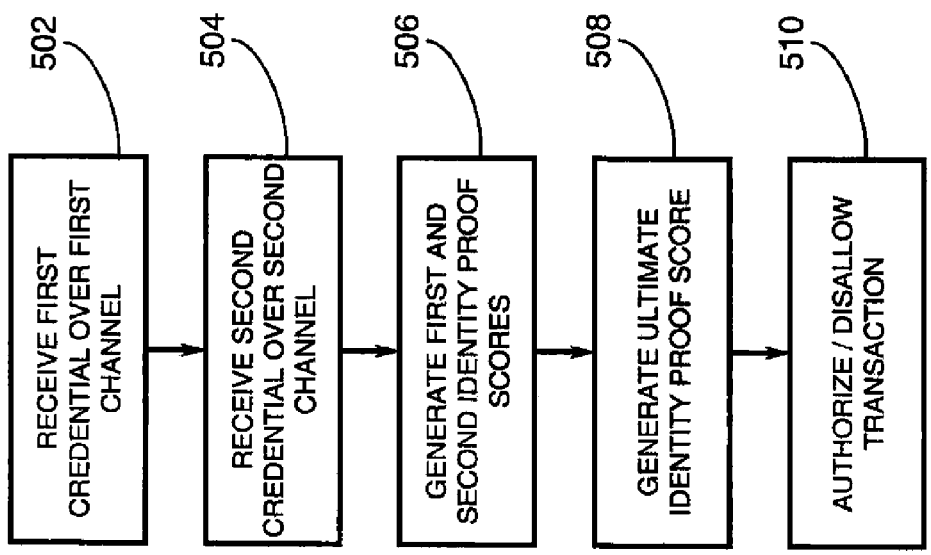
FIG. 4 is a flowchart depicting a method of authorizing a financial lending transaction from an identity proof score, provided by the identity proofing system.

The method by which the financial transaction authorization system 100 authorizes a financial lending transaction will now be discussed generally first, with reference to FIG. 4, followed subsequently by a more detailed explanation with reference to FIG. 7. As will be apparent, the following method is not limited to the authorization of financial lending transactions, but can be applied to other scenarios where proof of identity of an individual is required.

At step 502, the first credential sample acquisition procedure 412 of the identity scoring facility 400 receives a first credential from a user of the financial transaction authorization system 100 (via one of the credential sample acquisition facilities 300). Typically, the first received credential includes a first biometric.

At step 504, the second credential sample acquisition procedure 414 of the identity scoring facility 400 receives a second credential from the personal communications device 102 (via one of the credential sample acquisition facilities 300). Typically, the second received credential includes a second biometric.

At step 506, the identity proofing procedure 416 of the identity scoring facility 400 generates a first identity proof score from the first received credential and a first reference credential reference credential stored in the credential management facility 200. The identity proofing procedure 416 also generates a second identity proof score from the second received credential and a second reference credential stored in the credential management facility 200.

The first identity proof score is indicative of a first correlation level between the first credential and the first reference credential. The second identity proof score is indicative of a second correlation level between the second biometric credential and the second reference biometric. The identity scoring facility 400 may generate the second identity proof score either subsequently or concurrently with the first identity proof score.

At step 508, the identity proofing procedure 416 generates an ultimate identity proof score from the first identity proof score and the second identity proof score. The ultimate identity proof score is indicative of a confidence level in a correlation between the received credentials and the provisional identity of the user.

At step 510, the financial transaction executive facility 500 either authorizes or disallows the financial lending transaction based on at least the ultimate identity proof score. As discussed above, typically the financial transaction executive facility 500 will base the transaction authorization step on a number of factors in addition to the ultimate identity proof score, such as credit rating, type of transaction, and monetary sum.

Method of Identity Authentication—Overview

Figure 5:
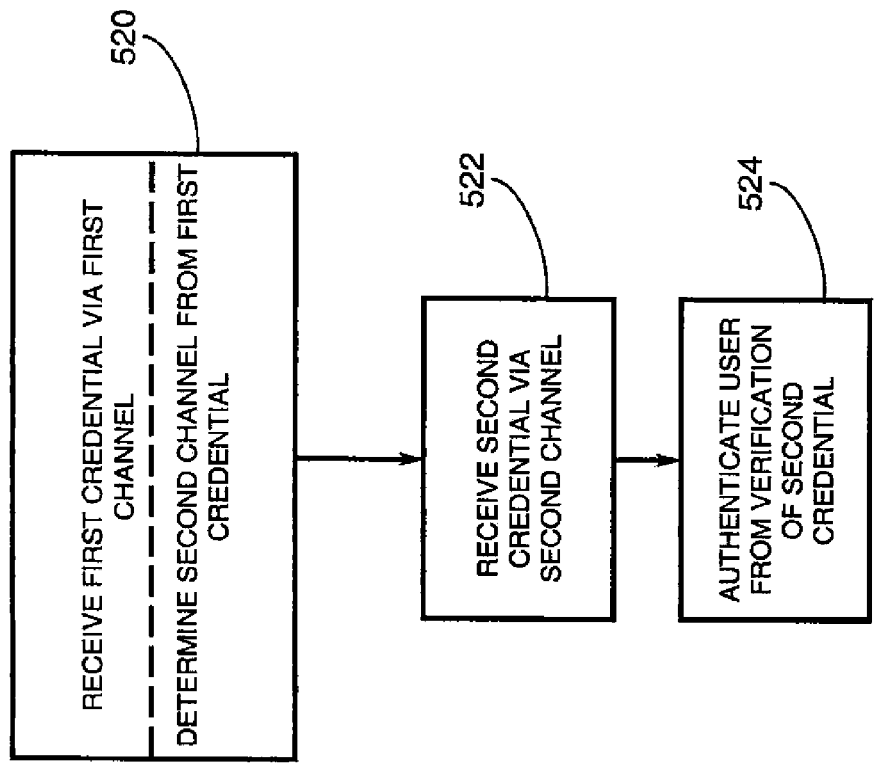
FIG. 5 is a flowchart depicting, by way of overview, a method of generating an identity proof score from the identity proofing system.

The method by which the identity scoring facility 400 authenticates the identity of a user of the identity proofing system 120 will now be discussed generally with reference to FIG. 5, followed subsequently by a more detailed explanation with reference to FIG. 7.

At step 520, the first credential sample acquisition procedure 412 of the identity scoring facility 400 receives a first credential over a first communications channel, and determines a second communications channel provisionally associated with the first credential. The second communications channel is different from the first communications channel, and the first credential is provisionally associated with the user.

At step 522, the second credential sample acquisition procedure 414 of the identity scoring facility 400 receives a second credential over the second communications channel.

At step 524, the identity proofing procedure 416 authenticates the identity of the user in accordance with a verification of the second credential.

Method of Registration with Identity Proofing System 120

Figure 6:
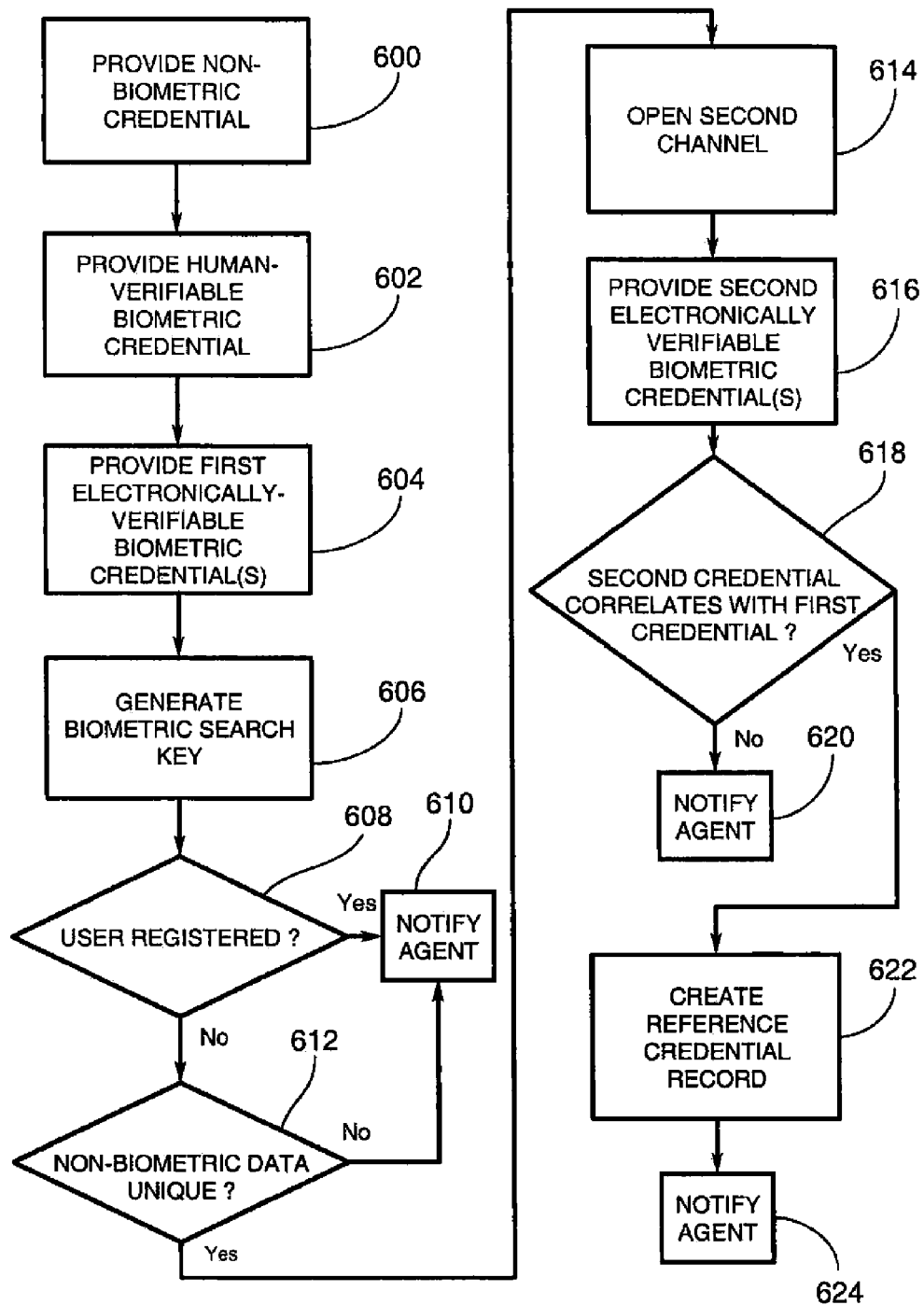
FIG. 6 is a flowchart depicting a method of registering with the identity proofing system.

To authenticate the identity of a user, the user must first register with the identity proofing system 120. The method by which a user registers with the identity proofing system 120 will now be discussed in detail, with reference to FIG. 6.

A prospective user initiates registration with the identity proofing system 120 by attending at the premises of an authorized human agent, and providing the agent with a first reference credential (comprising non-biometric credential data and biometric credential data). Initially, the prospective user will be asked to provide the non-biometric credential data, at step 600. For this purpose, preferably the prospective user provides the agent with the user's name, mailing address, and one or more network addresses at which the user can be contacted via the user's personal communications device 102 (such as the user's telephone number, e-mail address, dedicated IP address, and/or SMS address). Alternately, the prospective user provides the agent with one or more network addresses from which the user will initiate communication with one of the credential sample acquisition facilities 300.

As will be discussed, each network address will be used to establish a communications channel with the user's personal communications device 102 over which the prospective user will provide a second credential sample. Further, preferably each network address is such that communication between the user's personal communications device 102 and the credential sample acquisition facilities 300 does not occur at the premises of the authorized human agent, but instead occurs at a location other than the agent's premises.

Further, preferably the prospective user also provides the agent with the day/time (specified either as an absolute time or a relative time) at which the user can be contacted at each network address (or from which the user will contact the credential sample acquisition facility 300), and the number of contact attempts for each network address, a secret question and answer (known to the user). The agent typically inputs this reference data into the credential sample acquisition facility 300 via the keyboard 304 or the Smartcard reader 316.

The credential sample acquisition facility 300 then prompts the prospective user to provide the biometric credential data of the first reference credential via one or more of the biometric sample acquisition devices. Preferably the biometric credential data includes a digitized human-verifiable biometric. Accordingly, at step 602 preferably the credential sample acquisition facility 300 prompts the prospective user to provide the agent with a human-verifiable biometric. Typically, the human-verifiable biometric is a picture of the prospective user, which the agent digitally captures using the digital camera 308, or the optical image scanner 312 (if the image is provided on a government-issued instrument of identification, such as a driver's license or passport).

After the credential sample acquisition facility 300 has acquired the human-verifiable biometric, the credential sample acquisition facility 300 prompts the prospective user to provide the agent with a second reference credential (comprising one or more digitized electronically-verifiable biometrics). Accordingly, at step 604 the credential sample acquisition facility 300 prompts the prospective user to provide the agent with one or more biometrics via one or more of the biometric sample acquisition devices.

Typically, the electronically-verifiable biometrics include a fingerprint and/or a voice-sample of the prospective user, which the agent digitally captures using the fingerprint scanner 310 and the microphone 314, respectively. Alternately, the user may provide the electronically-verifiable biometric from a communications device over a communications channel that is separate from the data processing unit 306, but while the user is still in the presence of the agent. For instance, the user may provide a voice sample from the agent's telephone, which communicates with another credential sample acquisition facility 300.

After the credential sample acquisition facility 300 has acquired the electronically-verifiable biometrics, the credential sample acquisition facility 300 opens a first communications channel with the identity scoring facility 400 via the primary network 104, and transmits the first and second reference credentials to the identity scoring facility 400 over the first communications channel. In effect, the first communications channel is established between the biometric sample acquisition devices and the identity scoring facility 400, with the credential sample acquisition facility 300 acting as a buffer or intermediary between the biometric sample acquisition devices and the identity scoring facility 400.

The identity scoring facility 400 then queries the credential management facility 200 to verify that the credential management facility 200 does not include an existing reference credential record 202 for the identified user. To do so, at step 606 preferably the identity scoring facility 400 generates a search key that is uniquely associated with the electronically-verifiable biometrics that were acquired by the credential sample acquisition facility 300 at step 604. Preferably, each search key is generated using a suitable hash algorithm which has, as its inputs, several artifacts (points of interest) of the respective electronically-verifiable biometrics.

The identity scoring facility 400 then queries the credential management facility 200 with the search key, at step 608. If credential management facility 200 contains a reference credential record 202 whose index key matches the search key (i.e. the user has already registered with the identity proofing system 120), at step 610 the identity scoring facility 400 notifies the agent accordingly by causing the credential sample acquisition facility 300 to display a suitable message on the display device 302.

However, if the user has not already registered, at step 612 the identity scoring facility 400 then commands the credential management facility 200 to verify that the user's non-biometric credentials (e.g. name/address combination and network addresses) are uniquely associated with the user (i.e. the credential management facility 200 does not include any credential records 202 having the specified non-biometric credentials). If one or more of the non-biometric credentials are already included in the credential management facility 200, the identity scoring facility 400 notifies the agent accordingly, at step 610.

If the user has not already registered, and the specified non-biometric credentials are not already included in the credential management facility 200, at step 614 preferably the identity scoring facility 400 then opens a second communications channel by causing one of the credential sample acquisition facilities 300 to initiate communication (over the secondary network 106) with the user's personal communications device 102 at the network address specified in the non-biometric credential data. Alternately, depending on the configuration, the identity scoring facility 400 may configure one of the credential sample acquisition facilities 300 to accept a communication on the second communications channel (over the secondary network 106) from the personal communications device 102 at the specified network address.

For instance, if the network address is the user's telephone number, the identity scoring facility 400 communicates with the user's personal communications device 102 either by initiating a telephone call to the specified telephone number, or by receiving a telephone call from the specified telephone number.

Further, if included in the non-biometric credential data, the credential sample acquisition facility 300 initiates (or recognizes) this communication only at the specified day/time or the predetermined elapsed time after the identity scoring facility 400 receives the first and second credential.

After the second communications channel is opened (either by the identity scoring facility 400 or the user's personal communications device 102), a human agent of the identity proofing system 120 (not necessarily the same agent referenced in steps 600 to 610) speaks through the microphone 314 of the credential sample acquisition facility 300, prompting the user for the user's name, mailing address, and optionally the answer to the user's secret question. If correct, the agent inputs a confirmation message into the credential sample acquisition facility 300 via the keyboard 304, which prompts the user to provide one or more samples of the second credentials via the user's personal communications device 102, at step 616. Typically, the user will provide a voice-sample, however if the personal communications device 102 includes a fingerprint scanner, the user may instead provide a fingerprint sample.

The credential sample acquisition facility 300 then transmits the electronically-verifiable biometric sample (received at step 616) to the identity scoring facility 400 via the primary network 104. Accordingly, in effect, the second communications channel is established between the user's personal communications device 102 and the identity scoring facility 400, with the credential sample acquisition facility 300 acting as a buffer or intermediary between the user's personal communications device 102 and the identity scoring facility 400.

Upon receipt of the electronically-verifiable biometric sample(s), at step 618 the identity scoring facility 400 electronically compares the received biometric sample(s) against the electronically-verifiable reference biometric(s) previously acquired by the credential sample acquisition facility 300 at step 604.

If the received electronically-verifiable biometric sample(s) does not correlate with the previously-received electronically-verifiable reference biometric(s) within a predetermined tolerance, at step 620 the identity scoring facility 400 notifies the agent by causing the credential sample acquisition facility 300 to display a suitable message on the display device 302.

However, if the received electronically-verifiable biometric sample(s) does correlate with the previously-received electronically-verifiable reference biometric(s) within the predetermined tolerance, at step 622 the identity scoring facility 400 completes the registration process by transmitting the received first and second credentials data (acquired at steps 600 to 604) to the credential management facility 200, together with the index key (if generated), and causing the credential management facility 200 to create a reference credential record 202 containing the credential data and the associated search key.

Then, at step 624, the identity scoring facility 400 notifies the agent that registration was successful by causing the credential sample acquisition facility 300 to display a suitable message on the display device 302.

Method of Authorization with Identity Proofing System 120

The method by which the identity scoring facility 400 authenticates the identity of a user of the identity proofing system 120 will now be discussed in detail, with reference to FIG. 7.

At step 700, a user seeking to initiate or complete a financial lending transaction with the financial transaction authorization system 100 attends at the premises of an authorized human agent of the identity proofing system 120, and provides the agent with a first credential (comprising a non-biometric credential data sample and a biometric credential data sample). At this point, the first credential is only "provisionally" associated with the identity of the user, in the sense that subsequent validation steps must be performed to validate the association between the first credential and the identity.

Initially, the user provides the agent with the non-biometric credential data sample. For this purpose, preferably the user provides the agent with the user's name, and mailing address. The agent typically inputs this data sample into the credential sample acquisition facility 300 via the keyboard 304 or the Smartcard reader 316.

At step 702, the credential sample acquisition facility 300 then opens a first communications channel with the identity scoring facility 400 via the primary network 104, and transmits the received non-biometric credential data sample to the identity scoring facility 400 via the first communications channel.

At step 704, the first credential sample acquisition procedure 412 on the identity scoring facility 400 receives the non-biometric credential data sample, and then queries the credential management facility 200 (typically using the user's name/address combination) for an existing reference credential record 202 for the specified user. If the credential management facility 200 does not include a matching credential record 202 for the specified user, at step 706 the identity scoring facility 400 notifies the agent by causing the credential sample acquisition facility 300 to display a suitable message on the display device 302.

However, if the credential management facility 200 includes a matching credential record 202 for the specified user, at step 708 the credential management facility 200 transmits the located credential record 202 to the identity scoring facility 400. At step 710, the identity scoring facility 400 transmits a suitable message back to the credential sample acquisition facility 300 via the primary network 104, which causes the credential sample acquisition facility 300 to prompt the user to provide the biometric credential data sample (of the first credential) via one or more of the attached biometric sample acquisition devices.

Preferably the biometric credential data sample requested from the user includes a digitized human-verifiable biometric. Further, preferably the message transmitted from the identity scoring facility 400 to the credential sample acquisition facility 300, at step 710, includes the human-verifiable biometric that was stored in the corresponding credential record 202.

The credential sample acquisition facility 300 displays the human-verifiable biometric on the display device 302, which prompts the agent to ask the user to provide the agent with the human-verifiable biometric. Typically, the human-verifiable biometric is a picture of the prospective user.

At step 712, the agent manually compares the human-verifiable biometric displayed on the display device 302 against the corresponding biometric provided by the user attending at the agent's premises (typically the user's face), and generates a numeric certainty factor indicative of the degree of similarity (in the opinion of the agent) between the displayed human-verifiable biometric and the corresponding biometric of the user attending at the agent's premises. The agent inputs the numeric certainty factor into the credential sample acquisition facility 300 (via the keyboard 304), which in turn transmits the numeric certainty factor to the identity scoring facility 400.

Upon receipt of the numeric certainty factor, at step 714 the identity proofing procedure 416 on the identity scoring facility 400 generates a first identity proof score from the numeric certainty factor, and from the degree of correspondence between the non-biometric credential data sample provided by the user at step 702 and the non-biometric credential data received at step 708. The first identity proof score is indicative of a first correlation level between the first (non-biometric and biometric) credential and the first reference credential (as identified in the located credential record 202).

After the credential sample acquisition facility 300 transmits the non-biometric credential data sample to the identity scoring facility 400 at step 704, at step 716 the first credential sample acquisition procedure 412 on the identity scoring facility 400 determines the second communications channel over which it should receive the second credential, and then waits for receipt of the second credential over the second communications channel.

Step 716 can occur either prior or subsequent to step 714. However, preferably, the second communications channel is not established contemporaneously with steps 700 to 712, but is instead established significantly after step 712 (e.g. at least one hour after step 712), as determined by the non-biometric credential data of the credential record 202 that was received at step 708. Further, as discussed above, for enhanced security preferably the communication over the second communications channel does not occur at the premises of the authorized human agent, but instead occurs at a location other than the agent's premises.

To determine the appropriate second communications channel, the first credential sample acquisition procedure 412 extracts the network address from the non-biometric credential data of the credential record 202 that was received at step 708. As will be apparent, the second communications channel is uniquely associated with the non-biometric credential data of the received credential record 202. However, at this stage, the second communications channel is only "provisionally" associated with the first credential, in the sense that the association between the second communications channel and the first credential is not yet confirmed.

Preferably, the second credential sample acquisition procedure 414 then opens the second communications channel by causing one of the credential sample acquisition facilities 300 to initiate communication (over the secondary network 106) with the user's personal communications device 102 at the specified network address. Alternately, depending on the configuration, the identity scoring facility 400 may configure one of the credential sample acquisition facilities 300 to accept a communication on the second communications channel (over the secondary network 106) from the personal communications device 102 at the specified network address.

For instance, if the network address is the user's telephone number, the second credential sample acquisition procedure 414 communicates with the user's personal communications device 102 either by initiating a telephone call to the specified telephone number, or by receiving a telephone call from the specified telephone number.

Further, if included in the non-biometric credential data of the located credential record 202, the credential sample acquisition facility 300 initiates (or recognizes) this communication only at the specified day/time or a predetermined elapsed time after the identity scoring facility 400 receives the first credential.

After the second communications channel is opened (either by the identity scoring facility 400 or the user's personal communications device 102), the credential sample acquisition facility 300 prompts the user to provide the second credential. In contrast to the first credential, the second credential includes only a biometric sample. Further, in contrast to the human-verifiable biometric of the first credential, the second biometric credential is provided via one or more of the attached biometric sample acquisition devices. Therefore, the second biometric credential will be digitized by the biometric sample acquisition devices and will, therefore, by electronically verifiable. Typically, the user will provide a voice-sample, however if the personal communications device 102 includes a fingerprint scanner, the user may instead provide a fingerprint sample.

At step 718, the personal communications device 102 transmits the electronically-verifiable biometric sample to the credential sample acquisition facility 300 over the second communications channel. The credential sample acquisition facility 300 then transmits the electronically-verifiable biometric sample (received at step 718) to the identity scoring facility 400. Therefore, in effect, the second communications channel is established between the personal communications device 102 and the identity scoring facility 400, with the credential sample acquisition facility 300 acting as a buffer or intermediary between the personal communications device 102 and the identity scoring facility 400.

Upon receipt of the electronically-verifiable biometric sample, at step 720 the identity proofing procedure 416 on the identity scoring facility 400 generates a second identity proof score from the degree of correlation between the electronically-verifiable biometric sample provided by the user at step 718 and the corresponding digitized reference biometric in the credential record 202 returned at step 708. The second identity proof score is indicative of a second correlation level between the biometric sample received at step 718 and the reference biometric included in the located reference credential record 202.

The identity proofing procedure 416 on the identity scoring facility 400 then generates an ultimate identity proof score from the first and second identity proof scores, at step 722. The ultimate identity proof score is indicative of a confidence level in the correlation between the identity of the user, and the first and second received credentials.

The ultimate identity proof score can be calculated using any suitable algorithm that provides an indication in the degree of confidence that the located credential record 202 was created for the same user that attended at the premises of the agent at step 700. Suitable algorithms for generation of the ultimate identity proof score include a simple average, and weighted computation involving consideration of the inherent reliability of the first and second identity proof scores. For instance, a fingerprint biometric might be weighted more heavily than a voiceprint biometric, which in turn might be weighted more heavily than a picture biometric. Alternately, a voiceprint biometric received by a wired personal communications device 102 might be weighted more heavily than a wireless personal communications device 102.

The identity scoring facility 400 then transmits the ultimate identity proof score to the financial transaction executive facility 500 via the primary network 104. The financial transaction executive facility 500 then either authorizes or disallows the financial lending transaction, at step 724, based on at least the received ultimate identity proof score.

This invention is defined by the claims appended hereto, with the foregoing description being merely illustrative of the preferred embodiment of the invention. Persons of ordinary skill may envisage certain modifications to the described embodiment which, although not explicitly suggested herein, do not depart from the scope of the invention, as defined by the appended claims.

The invention claimed is:

1. A method for authenticating an identity comprising:
a computing device receiving a first credential over a first communications channel, the first received credential being provisionally associated with an identity;
the computing device determining a second communications channel from a comparison between the first received credential and a first reference credential, the second communications channel being provisionally associated with the first credential and being different from the first communications channel;
the computing device opening the second communications channel and receiving a second credential over the opened second communications channel; and
the computing device authenticating the identity by generating a first identity proof score from a correlation between the first received credential and the first reference credential, generating a second identity proof score from a correlation between the second received credential and a second reference credential, and generating an ultimate identity proof score from the first identity proof score and the second identity proof score,
wherein the first identity proof score is indicative of a first correlation level between the first received credential and the first reference credential, the second identity proof score is indicative of a second correlation level between the second received credential and the second reference credential, and the ultimate identity proof score is indicative of a confidence level in a correlation between the received credentials and the identity.

2. The method according to claim 1, wherein the first received credential comprises a first received biometric credential and a first received non-biometric credential, the first reference credential comprises a first reference biometric credential and a first reference non-biometric credential, and the first identity proof score generating comprises generating the first identity proof score from a comparison between the first received biometric credential and the first reference biometric credential and a comparison between the first received non-biometric credential and the first reference non-biometric credential.

3. The method according to claim 2, wherein the second communications channel is uniquely associated with the first reference non-biometric credential, and the communication channel determining comprises the computing device determining the second communications channel from a comparison between the first received non-biometric credential and the first reference non-biometric credential.

4. The method according to claim 2, wherein the second received credential comprises a second received biometric credential, the second reference credential comprises a second reference biometric credential, and the second identity proof score generating comprises generating the second identity proof score from a comparison between the second received biometric credential and the second reference biometric credential.

5. The method according to claim 1, wherein the second communications channel opening comprising the computing device initiating communication at a predetermined time to a communications address uniquely associated with the first reference credential, the predetermined time being associated with the first reference credential.

6. The method according to claim 5, wherein the predetermined time comprises a predetermined elapsed time after receipt of the first received credential.

7. The method according to claim 6, wherein the second communications channel comprises a telephone network channel, the communications address comprises a telephone number, and the communication initiating comprises the computing device initiating a telephone call to the telephone number at the predetermined elapsed time.

8. An identity proofing system, comprising:
a credential management facility retaining reference credentials;
a first credential sample acquisition procedure provided as computer program code and configured to receive a first credential over a first communications channel and to determine a second communications channel from a comparison between the first received credential and a first reference credential, the second communications channel being provisionally associated with the first credential and being different from the first communications channel, the first credential being provisionally associated with an identity;
a second credential sample acquisition procedure provided as computer program code and configured to receive a second credential over the second communications channel, the second credential sample acquisition procedure being configured to receive the second credential by opening the second communications channel and to receive the second credential over the opened second communications channel; and
an identity proofing procedure provided as computer program code in communication with the sample acquisition procedures and the credential management facility and being configured to authenticate the identity by generating a first identity proof score from a correlation between the first received credential and the first reference credential, generating a second identity proof score from a correlation between the second received credential and a second reference credential, and generating an ultimate identity proof score from the first identity proof score and the second identity proof score, wherein the first identity proof score is indicative of a first correlation level between the first received credential and the first reference credential, the second identity proof score is indicative of a second correlation level between the second received credential and the second reference credential, and the ultimate identity proof score is indicative of a confidence level in a correlation between the received credentials and the identity.

9. The identity proofing system according to claim 8, wherein the first received credential comprises a first received biometric credential and a first received non-biometric credential, the first reference credential comprises a first reference biometric credential and a first reference non-biometric credential, and the identity proofing procedure is configured to generate the first identity proof score from a comparison between the first received biometric credential and the first reference biometric credential and a comparison between the first received non-biometric credential and the first reference non-biometric credential.

10. The identity proofing system according to claim 9, wherein the second communications channel is uniquely associated with the first reference non-biometric credential, and the second credential sample acquisition procedure is configured to determine the second communications channel from a comparison between the first received non-biometric credential and the first reference non-biometric credential.

11. The identity proofing system according to claim 9, wherein the second received credential comprises a second received biometric credential, the second reference credential comprises a second reference biometric credential, and the identity proofing procedure is configured to generate the second identity proof score from a comparison between the second received biometric credential and the second reference biometric credential.

12. The identity proofing system according to claim 8, wherein the second credential sample acquisition procedure is configured to open the second communications channel by initiating communication at a predetermined time to a communications address uniquely associated with the first reference credential, the predetermined time being associated with the first reference credential.

13. The identity proofing system according to claim 12, wherein the predetermined time comprises a predetermined elapsed time after receipt of the first received credential.

14. The identity proofing system according to claim 13, wherein the second communications channel comprises a telephone network channel, the communications address comprises a telephone number, and the second credential sample acquisition procedure is configured to initiate the communication by initiating a telephone call to the telephone number at the predetermined elapsed time.

* * * * *